(12) United States Patent
Graville

(10) Patent No.: US 7,544,344 B2
(45) Date of Patent: Jun. 9, 2009

(54) PROCESS FOR RECOVERING SULPHUR FROM A GAS STREAM CONTAINING HYDROGEN SULPHIDE

(75) Inventor: Stephen Rhys Graville, Sheffield (GB)

(73) Assignee: The BOC Group plc (GB)

( * ) Notice: Subject to any disclaimer, the term of this patent is extended or adjusted under 35 U.S.C. 154(b) by 207 days.

(21) Appl. No.: 10/564,605

(22) PCT Filed: Jul. 13, 2004

(86) PCT No.: PCT/GB2004/003032

§ 371 (c)(1),
(2), (4) Date: Jun. 27, 2006

(87) PCT Pub. No.: WO2005/007570

PCT Pub. Date: Jan. 27, 2005

(65) Prior Publication Data

US 2007/0134147 A1    Jun. 14, 2007

(30) Foreign Application Priority Data

Jul. 14, 2003    (GB)    .................................. 0316433.2

(51) Int. Cl.
*C01B 17/04*    (2006.01)

(52) U.S. Cl. .............. 423/573.1; 423/242.1; 423/574.1; 423/576.8

(58) Field of Classification Search ................. 423/237, 423/573.1, 574.1, 576.8, 242.1
See application file for complete search history.

(56) References Cited

U.S. PATENT DOCUMENTS

| | | | | |
|---|---|---|---|---|
| 4,798,716 | A | * | 1/1989 | Palm ........................ 423/574.1 |
| 5,468,458 | A | * | 11/1995 | Watson ........................ 423/222 |
| 2002/0021993 | A1 | * | 2/2002 | Watson et al. ............... 423/224 |
| 2002/0025292 | A1 | * | 2/2002 | Watson et al. ............ 423/574.1 |

* cited by examiner

*Primary Examiner*—Timothy C Vanoy
(74) *Attorney, Agent, or Firm*—Philip H. Von Neida

(57) ABSTRACT

A feed gas stream containing hydrogen sulfide is subjected to a Claus reaction in a Claus furnace (16). Oxygen or oxygen-enriched air containing at least 80% by volume oxygen is supplied to the furnace (16) to support combustion of the hydrogen sulfide. Sulfur vapour is condensed out of the resultant effluent gas in a sulfur condenser (3). The sulfur depleted effluent gas is subjected to a plurality of stages of catalytic reaction of hydrogen sulfide in order to form further sulfur vapour in catalytic reactors (36, 44) and (52) with the sulfur vapour being condensed out of the gas in sulfur condensers (38, 46) and (54). The sulfur dioxide content of the resulting tail gas is reduced to hydrogen sulfide in reactor (6).

5 Claims, 4 Drawing Sheets

PROCESS FOR RECOVERING SULPHUR FROM A GAS STREAM CONTAINING HYDROGEN SULPHIDE

Figure 1:
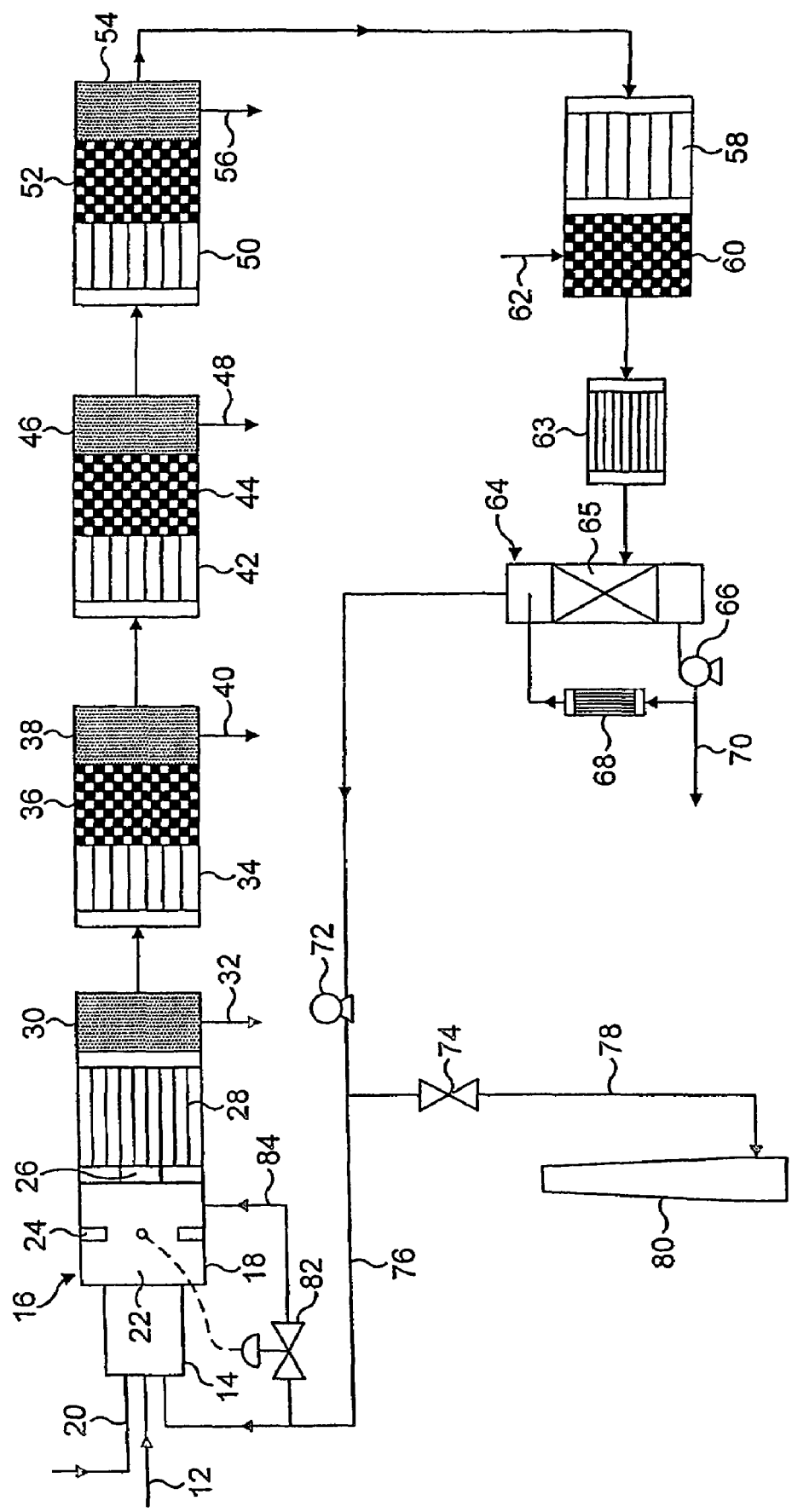

National Stage application of International Application No. PCT/GB2004/003032 filed Jul. 13, 2004, which claims priority to British Application No. GB 0316433.2 filed Jul. 14, 2003.

This invention relates to a process for recovering sulphur from a gas stream containing hydrogen sulphide and ammonia.

Gas streams containing hydrogen sulphide and ammonia are formed, for example, as waste streams in the operation of an oil refinery. In view of their hydrogen sulphide and ammonia content, such gas streams are not permitted to be discharged to the atmosphere without first being treated to remove almost all of the hydrogen sulphide and ammonia.

U.S. Pat. No. 4,798,716 discloses a process for the recovery of sulphur from a gaseous stream containing hydrogen sulphide. In this process a Claus furnace is operated with pure oxygen or oxygen-enriched air to support combustion of part of the hydrogen sulphide content of the feed. Sulphur dioxide which is formed as a combustion product reacts with residual hydrogen sulphide by the Claus reaction to form sulphur vapour. The Claus reaction does not go to completion. An effluent gas flow including sulphur vapour, hydrogen sulphide, sulphur dioxide and water vapour leaves the Claus furnace. After removal of the sulphur vapour by condensation, the hydrogen sulphide and sulphur dioxide in the effluent gas flow are subjected to a plurality of further stages of Claus reaction over a suitable catalyst. The sulphur vapour is condensed out of the effluent gas flow after each catalytic Claus stage. A tail gas containing only small amounts of sulphur-containing molecules is thereby formed. The tail gas is hydrogenated to convert all the sulphur species therein to hydrogen sulphide. The hydrogenated tail gas has water condensed out of it. A part of the so treated tail gas is used to moderate the temperature in the Claus furnace by returning that part to the furnace as a diluent stream. A further part of the treated tail gas may be returned to the inlet of the more or most upstream of the catalytic Claus stages.

In order to prevent a continuous build-up of gases in the process as a result of the recycle a part of the effluent gas flow is vented to an incinerator from the outlet of the sulphur condenser associated with the more or most downstream of the catalytic Claus stages. The proportion of the effluent gas flow that is so vented is determined by the setting of a flow control valve. This setting is dependent on the pressure at the inlet to a compressor which is used to urge the hydrogenated tail gas through the water condenser. The greater this pressure, the higher the proportion of the effluent gas flow that is vented.

It is desirable to maintain high percentage conversion of hydrogen sulphide to sulphur, to keep down the rate of venting gas from the process, and to maintain a high temperature in the combustion region of the furnace to ensure complete combustion of the ammonia.

According to a first aspect of the present invention there is provided a process for recovering sulphur from a feed gaseous stream containing hydrogen sulphide and ammonia, comprising the steps of:
 a) introducing the feed gaseous stream into a combustion region in a Claus furnace;
 b) supplying to the combustion region pure oxygen or oxygen-enriched air containing at least 80 mole per cent of oxygen;
 c) burning in the combustion region a portion of the hydrogen sulphide content of the feed gaseous stream to form sulphur dioxide and water vapour, a proportion of the sulphur dioxide reacting with residual hydrogen sulphide in the furnace to form sulphur vapour;
 d) providing temperature conditions in the Claus furnace to ensure complete destruction of the ammonia content of the feed gaseous stream;
 e) withdrawing an effluent gas stream from the furnace comprising sulphur vapour, water vapour, hydrogen sulphide, and sulphur dioxide;
 f) condensing sulphur vapour out of the effluent gas stream to form a sulphur-vapour depleted gas stream;
 g) subjecting the sulphur-vapour depleted effluent gas stream to an upstream and at least one downstream stage of catalytic reaction of hydrogen sulphide to form further sulphur vapour;
 h) condensing the further sulphur vapour downstream of each said stage of catalytic reaction, and withdrawing a tail gas containing residual hydrogen sulphide and sulphur dioxide;
 i) reducing the sulphur dioxide content of the tail gas to hydrogen sulphide;
 j) condensing water vapour out of the reduced tail gas to form a water vapour-depleted reduced tail gas;
 k) dividing the water vapour-depleted reduced tail gas into a first portion which is recycled at least in part to the combustion region and a second portion which is discharged from the process, wherein the first portion comprises at least 60% by volume of the water vapour-depleted reduced tail gas; and
 l) controlling the rate of recycle of the said first portion to the combustion region so as to maintain the said temperature conditions to ensure complete destruction of the ammonia and attainment of at least a desired minimum percentage conversion of hydrogen sulphide, and passing any excess first portion to a part of the Claus furnace remote from the combustion region and/or to the upstream catalytic stage.

The second portion of the water vapour-depleted reduced tail gas is preferably sent to an incinerator. In comparison with the process described in U.S. Pat. No. 4,798,716, the process according to the invention has the advantage of keeping down the size of the gas stream that is vented, typically for incineration. A particular feature of the process according to the invention is that by virtue of the position from which the vent gas stream is taken, relatively high levels of hydrogen can be maintained through the process and there is no need to provide an external source of hydrogen (save for emergency backup) for the purposes of reducing the sulphur dioxide in the tail gas because there is already a surfeit of hydrogen in the tail gas for this purpose.

By recycling at least 60% by volume of the water vapour-depleted reduced tail gas, high effective rates of conversion of hydrogen sulphide to sulphur vapour may be maintained.

Preferably the temperature of the gas exiting the combustion region of the Claus furnace is monitored and the rate of recycle of the first portion of the water vapour-depleted reduced tail gas to the combustion region is controlled so as to maintain the monitored temperature at or above a chosen value which ensures essentially complete destruction of ammonia, i.e. a temperature of at least 1300° C. Any excess gas, which there typically is, may be introduced into one or more of a number of different locations of the Claus furnace remote from the combustion region or to the said upstream stage of catalytic reaction to form further sulphur vapour.

In one example of the process according to the first aspect of the invention, the furnace may be provided with a choke ring, the combustion region being formed upstream of the choke ring, and the excess first portion of the water vapour-depleted reduced tail gas being introduced downstream of the choke ring.

Alternatively, any excess first portion may be introduced into the inlet of the upstream catalytic stage which is preferably of Claus reaction.

It is more advantageous, however, to introduce any excess first portion into an intermediate region of the upstream catalytic stage (of Claus reaction) so as to provide cooling to that stage. Such cooling helps to increase the extent of the Claus reaction that takes place in that stage and therefore helps to increase the total percentage conversion of hydrogen sulphide to sulphur that first is achievable by the process according to the first aspect of the invention. The position of the introduction of excess first portion of the water vapour-depleted reduced tail gas into the intermediate region of the upstream (first) catalytic stage of Claus reaction may be selected so as not to compromise the destruction of traces of carbon oxysulphide and carbon disulphide which may be completed upstream of the introduction.

Such introduction of a gas stream containing hydrogen sulphide into an intermediate region of the most upstream catalytic Claus stage of a Claus process is not however confined to a process according to the first aspect of the present invention. It may also be used, for example in the process according to EP-A-0 565 316.

Accordingly, in a second aspect of the invention, there is provided a process for recovering sulphur from a feed gas stream comprising hydrogen sulphide, including subjecting the feed gas stream to Claus reaction between hydrogen sulphide and sulphur dioxide in a train of stages comprising, in sequence, at least one thermal stage and a first catalytic stage, taking at least part of the flow through the train from downstream of the first catalytic stage, reducing its sulphur dioxide content to hydrogen sulphide to form a reduced gas flow, condensing water vapour out of the reduced gas flow, and introducing a temperature moderating stream of the resulting water vapour-depleted reduced gas flow into an intermediate region of the first catalytic stage.

Preferably, the introduction of the said temperature moderating stream is controlled so as to keep the temperature of the gas flow out of the first catalytic stage at or above a chosen temperature. The chosen temperature is preferably at least 5° C. above the dew point of the sulphur, and is more preferably in the range 270° C. to 275° C. The region of the first catalytic stage upstream of the introduction of the temperature moderating stream is preferably operated at a temperature which ensures essentially complete destruction of any carbon oxysulphide and any carbon disulphide present. This temperature is therefore preferably in the range of 300° C. to 350° C.

In both aspects of the invention, the water vapour-depleted reduced gas flow is preferably heated to above the sulphur solidification temperature upstream of being introduced into the first catalytic stage. The chosen temperature is preferably in the range 130 to 140° C. Such heating eliminates the possibility of sulphur solidifying on pipework through which the water vapour-depleted reduced gas flow is introduced.

Preferably in the process according to the first aspect of the invention the said first portion constitutes from 65 to 95% by volume of the water vapour-depleted reduced tail gas. More preferably, it constitutes from 70 to 95% by volume of the water vapour-depleted reduced tail gas. Most preferably it constitutes from 75 to 90% by volume of the water vapour-depleted reduced tail gas.

Preferably, in the process according to the first aspect of the present invention, the said reduction of the sulphur dioxide is performed catalytically at a temperature in the range of 200 to 400° C.

Preferably, in the process according to the first aspect of the invention, the tail gas is heated by indirect heat exchange upstream of the reduction of its sulphur dioxide content. Such heating avoids dilution of the tail gas with combustion products in order to achieve an optimum temperature for the reduction. The dilution would increase the size of the vent stream and the rate at which gases such as carbon dioxide and nitrogen are recycled to upstream parts of the process.

Preferably, in the process according to the first aspect of the invention, the combustion region is operated at a temperature sufficient to ensure that a large (more than fivefold) stoichiometric excess of hydrogen is formed over that required for the reduction of the tail gas. As a result, it becomes unnecessary to generate hydrogen externally for use in the process according to the first aspect of the invention.

In the process according to the first aspect of the invention there are typically one or two stages of catalytic Claus reaction downstream of the said upstream stage which is also a catalytic Claus stage. Alternatively, there can be one stage of catalytic Claus reaction followed (downstream of sulphur removal) by a catalytic stage of selective oxidation of hydrogen sulphide to sulphur. It is also possible to employ just the upstream stage of catalytic reaction followed (downstream of sulphur removal) by a catalytic stage of selective oxidation of hydrogen sulphide to sulphur.

In the process according to the first aspect of the invention, the said first portion is preferably introduced into the combustion region separately from the oxygen or oxygen-enriched air. This avoids risk of hazardous conditions entailed in premixing of the oxygen or oxygen-enriched air and the first portion.

In the process according to the first aspect of the invention flow of the first portion of the water vapour-depleted, reduced tail gas is preferably assisted by operation of a blower or compressor downstream of the water condensation. The second portion of the water vapour-depleted, reduced tail gas is preferably taken from downstream of the compressor or blower. If desired, flow of tail gas to the reduction may be assisted by one or more steam-driven eductors.

The process according to the first aspect of the present invention makes it possible to achieve a sulphur recovery in excess of 99.5% under essentially all operating conditions. Even higher sulphur recoveries can be achieved by treating the second portion of the water vapour-depleted reduced tail gas so as to recover hydrogen sulphide therefrom and recycling the recovered hydrogen sulphide to a stage of the process in which the Claus reaction takes place. The treatment is preferably performed by absorption of the hydrogen sulphide from the second portion. The absorbent is preferably periodically regenerated and the hydrogen sulphide so generated returned to a stage of the process where the Claus reaction takes place. By such means, the total recovery of sulphur may be increased to more than 99.9%.

Another advantage of the process according to the first aspect of the invention, is that a subsisting air-based Claus plant may be readily adapted to perform it. A typical retrofit involves substituting an oxy-feed or an oxy-air-feed burner for the subsisting burner; fitting a catalytic hydrogenator (provided with an indirect fired reheater), an indirect cooling heat exchanger downstream of the catalytic hydrogenator, a water condenser, preferably of the direct quench kind, downstream of the indirect cooling heat exchanger, a recycle compressor or blower, and appropriate pipework and valves. Thus, any subsisting Claus furnace, catalytic Claus reactors, and incinerator can be utilised.

A further advantage of the process according to the first aspect of the invention is that process control is simple. Preferably, the ratio of the flow rate of the first portion of the water vapour-depleted reduced tail gas to the flow rate of the second portion thereof is fixed. Division of the first portion between the combustion region of the Claus furnace and other region (s) thereof or the upstream catalytic Claus stage may be controlled by sensing the temperature of gas leaving the combustion region of the Claus furnace.

Such control systems can readily cater for operation of the process at below its full capacity.

The invention also provides a plant for performing the process according to either the first aspect of the invention or the second aspect of the invention (or both).

Figure 2:
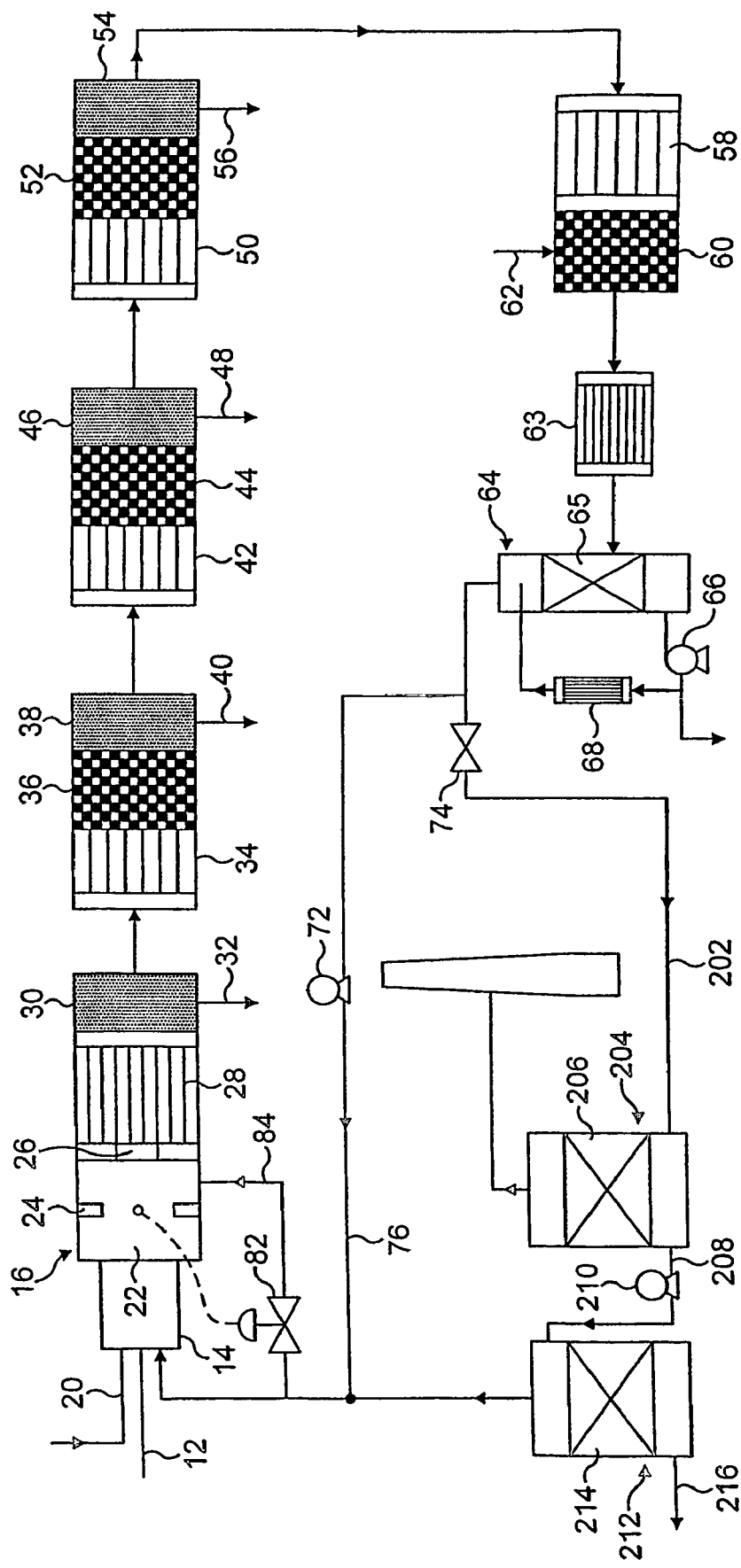
Figure 3:
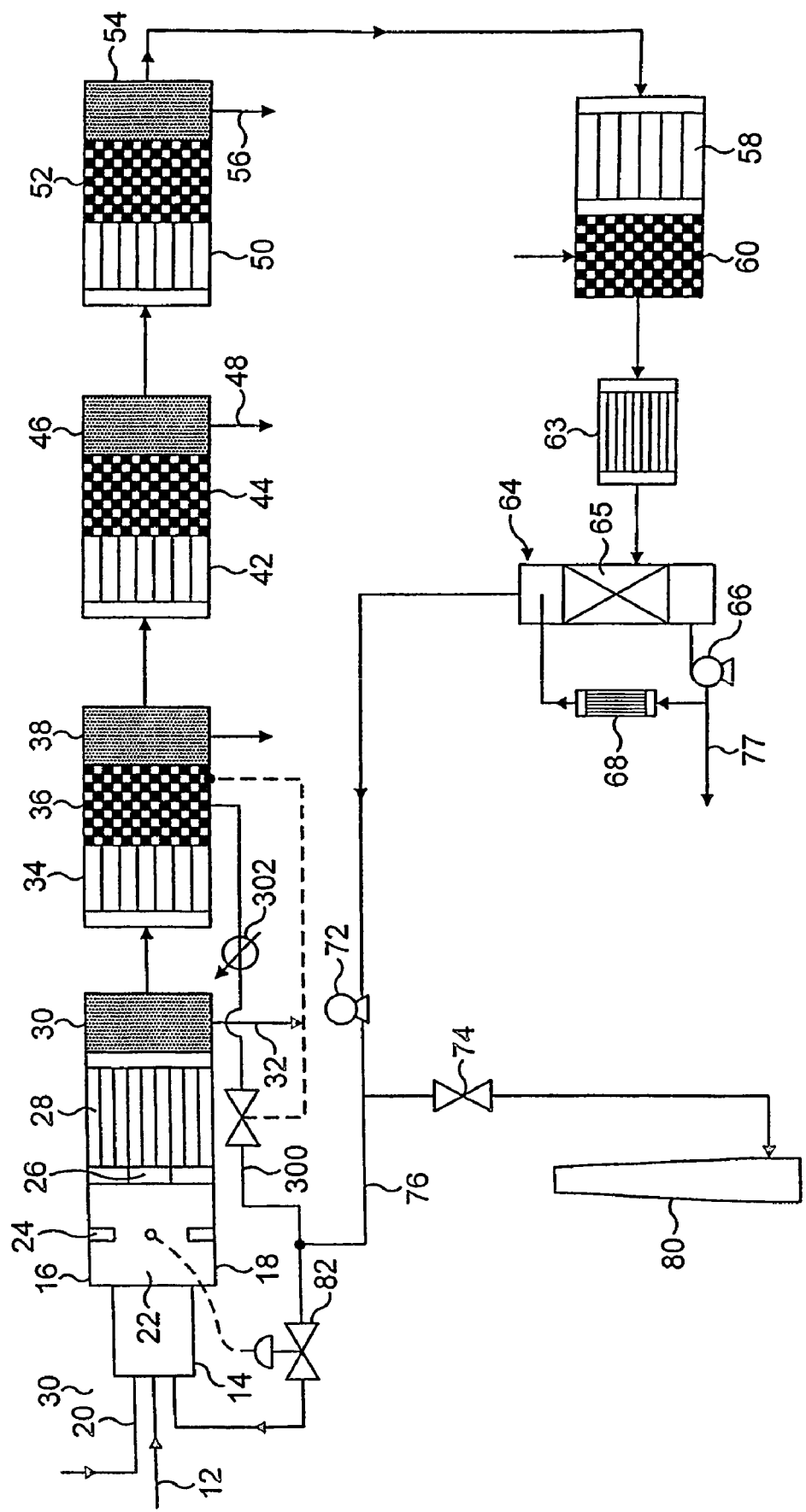
Figure 4:
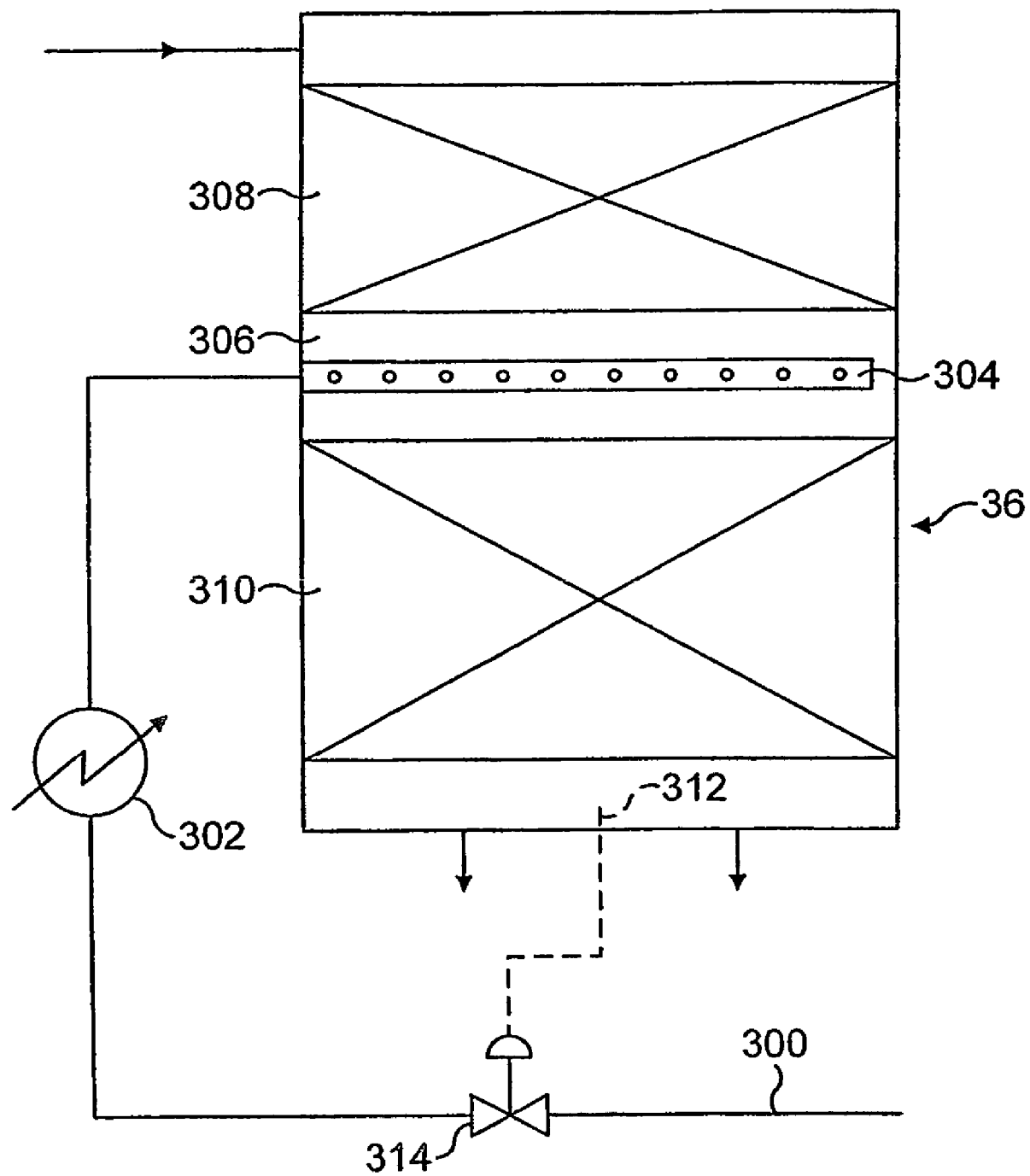

Processes according to the invention will now be described by way of example with reference to the accompanying drawings, in which:

FIG. 1 is a schematic flow diagram of a first Claus plant;
FIG. 2 is a schematic flow diagram of a second Claus plant;
FIG. 3 is a schematic flow diagram of a third Claus plant; and
FIG. 4 is a schematic diagram of the arrangement of the upstream catalytic Claus reactor of the plant drawn in FIG. 3.

The drawings are not to scale. Like parts in the different Figures are indicated by the same reference numerals.

Referring to FIG. 1 of the drawings, a hydrogen sulphide containing feed gas stream typically comprising hydrogen sulphide, carbon dioxide, water vapour and ammonia and sometimes additionally including one or more hydrocarbons is fed from a pipeline 12 to a burner 14 which either first axially into a thermal reactor in the form of a refractory-lined Claus furnace 16, through one end wall thereof, or fires tangentially through a side wall at a position close to the end wall 18, typically at right angles to the axis of the Claus furnace 16. The feed gas typically contains at least 60 or 70% by volume of combustibles. If the feed gas stream is a waste stream produced in an oil refinery it may be an acid gas (sometimes referred to as "amine gas") or a mixture of amine gas with sour water stripper gas. The hydrogen sulphide containing feed gas stream is supplied to the burner 14 typically at a temperature in the range of 0° C. to 90° C., preferably 10° C. to 60° C., and is typically not preheated upstream of the Claus furnace 16. The burner 14 is supplied separately from a pipeline 20 with a stream of commercially pure oxygen or a stream of air highly enriched in oxygen. In either case, the mole fraction of oxygen in the gas that is supplied along the pipeline 20 is at least 0.8 and preferably at least 0.9. In general, the more nitrogen that is supplied with the oxygen along the pipeline 20, the less gas can be recycled to the furnace 16. Thus reducing the purity of the oxygen tends to drive down the percentage recovery of sulphur from the feed gas. The oxygen stream can typically be separated from air by, for example, pressure swing adsorption or by fractional distillation, the latter separation method being able to produce oxygen at a purity in excess of 99%.

The rate of flow of oxygen molecules into the Claus furnace 16 from the burner 14 is typically that required to support complete combustion of all the hydrocarbons, complete oxidation of ammonia to nitrogen and water vapour (though some ammonia simply dissociates in the combustion (flame) region 22 produced by operation of the burner 14, thereby forming nitrogen and hydrogen), and combustion of approximately 33.3 mole per cent of the hydrogen sulphide, sulphur dioxide and water vapour being formed as a result. In addition there is thermal dissociation of hydrogen sulphide into hydrogen and sulphur vapour. In general, thermal dissociation reactions become more significant as the flame temperature in the combustion region rises.

The sulphur dioxide formed in the combustion region 22 reacts in the Claus furnace 16 with residual hydrogen sulphide by the Claus reaction so as to form sulphur vapour and water vapour. Various other chemical reactions may also take place in the furnace 16 such as the formation of carbon monoxide, carbon oxysulphide and carbon disulphide. The Claus reaction between hydrogen sulphide and sulphur dioxide cannot go to completion in the Claus furnace 16. Indeed, it is typically only from 50 to 70% complete. Various measures may be taken in an attempt to maximise the amount of Claus reaction that takes place. In one measure, the furnace is provided with a choke ring 24 at an intermediate location thereof. (The choke ring 24 can increase the average residence time of the reacting species in the furnace 16, which is generally believed to be beneficial.)

In operating the burner 14 and the Claus furnace 16 care should of course be taken to avoid thermal damage to the refractory lining. The angle and the position of entry of the burner 14 into the Claus furnace 16 and the flame configuration are chosen so as to avoid such damage. The thermal dissociation of hydrogen sulphide and the recycle of tail gas, which will be described below, have cooling effects which can be taken into account in selecting the position and angle of entry of the burner 14.

As a result of the chemical reactions that take place in the Claus furnace 16, an effluent gas stream typically comprising hydrogen sulphide, sulphur dioxide, water vapour, sulphur vapour, hydrogen, carbon dioxide, carbon monoxide, argon, nitrogen and traces of carbon oxysulphide leaves the Claus furnace 16 through an outlet 26, typically at a temperature in the range of 1000° C. to 1400° C. At such temperatures, some of the components of the effluent gas stream will be reacting with one another, so it is difficult to specify the exact composition of the effluent gas stream. But by maintaining gas temperatures of at least 1300° C. at the end of the flame complete destruction of ammonia can be achieved, thereby avoiding deleterious chemical reaction between catalyst and ammonia in downstream catalytic stages which will be described below. The effluent gas stream passes from the outlet 26 directly into a waste heat boiler 28 or other form of indirect heat exchanger in which it is cooled to a temperature typically in the range of 300° C. to 500° C. During the passage of the effluent gas stream through the waste heat boiler 28 there is a tendency for some of the hydrogen to re-associate with sulphur vapour to form hydrogen sulphide. The cooled effluent gas stream flows from the waste heat boiler 28 into a first sulphur condenser 30 in which sulphur vapour is extracted from it by condensation. The condensed sulphur may be allowed to flow along a pipeline 32 to a sulphur pit (not shown) via a sulphur seal leg (not shown).

The resulting sulphur-depleted gas stream flows through a reheater 34 in which it is heated from its condensation temperature to a temperature in the range 250° C. to 300° C. by indirect heat exchange with hot gas, for example superheated steam. The thus reheated sulphur vapour-depleted gas stream flows to an upstream catalytic Claus reactor 36, which may employ any conventional catalyst of the Claus reaction between hydrogen sulphide and sulphur dioxide. The catalytic Claus reactor 36 may, for example, employ a supported bed of activated alumina as the catalyst. Not only does the activated alumina catalyse the Claus reaction but also the decomposition (by hydrolysis) of carbon oxysulphide and any carbon disulphide, which compounds have an adverse effect on the total conversion of hydrogen sulphide to sulphur achievable by the process. The hydrogen content of the sulphur-depleted gas stream does not participate in any significant reaction in the catalytic Claus reactor 36.

A resulting further reacted gas stream passes out of the catalytic Claus reactor 36 and flows into a second sulphur condenser 38 in which the sulphur vapour formed in the reactor 36 is condensed out of the gas stream. The resulting condensed sulphur flows through a pipeline 40 to the sulphur pit (not shown) via a sulphur seal leg (not shown).

Downstream of the second sulphur condenser 38, the gas stream flowing therefrom may pass through either one or a plurality of further catalytic Claus reactors in series. In FIG. 1, two such further catalytic Claus reactors 44 and 52 are shown. Both the further catalytic Claus reactors 44 and 52 are preceded by indirect reheaters 42 and 50, respectively, and followed by third and fourth sulphur condensers 46 and 54, respectively. The sulphur condensers 46 and 54 are operatively associated with sulphur pipelines 48 and 56, respectively, which lead via sulphur seal legs (not shown) to the sulphur pit (not shown). In general, the configuration and operation of both of the further catalytic Claus converters 44 and 52 and their associated units, mentioned above, are analogous to the configuration and operation of the upstream catalytic Claus reactor 36 and its associated units. Two points are, however, worthy of note. Firstly, the catalytic reactors 44 and 52 may be smaller or contain less catalyst than the reactor 36 in view of the reduced amount of Claus reaction that takes place therein. Secondly, the catalytic reactors 44 and 52 may generally operate at a slightly lower temperature or temperatures than the catalytic reactor 36, in which a higher temperature is typically required in order to effect complete destruction of carbon oxysulphide and any carbon disulphide present in the gas mixture flowing out of the first sulphur condenser 30.

After three stages of catalytic Claus reaction, the gas mixture flowing out of the fourth sulphur condenser 54 can be classed as a tail gas because it typically contains less than 5% of the sulphur atoms in the feed gas mixture in the pipeline 12. Typically, the tail gas might be sent to an incinerator, but in accordance with the process according to the first aspect of the invention it is subjected to further treatment. The tail gas is reheated to a temperature of approximately 300° C. in a reheater 58 by indirect heat exchange with hot gas (generated for example by burning or partially oxidising a fuel). The resulting heated tail gas stream passes to a catalytic reduction reactor 60 in which all the sulphur dioxide and any residual traces of sulphur vapour are reduced by hydrogen to hydrogen sulphide over a suitable catalyst. Suitable catalysts for the reduction of sulphur dioxide to hydrogen sulphide are well known in the art. The catalyst may, for example, comprise a supported mixed cobalt-molybdenum oxide. In addition to the reaction between sulphur dioxide and hydrogen to form hydrogen sulphide and water and the reaction between any sulphur vapour present and hydrogen to form hydrogen sulphide, other reactions can take place in the catalytic reduction reactor 60, though these are generally not of significance, although any carbon monoxide present reacts with water vapour to form hydrogen and carbon dioxide.

The tail gas stream entering the catalytic reduction reactor 60 contains a large stoichiometric excess of hydrogen over that required to react with the sulphur dioxide present. As a result the reaction therebetween will go to completion in the reactor 60, thereby ensuring that there is no tendency for sulphur to deposit in downstream, lower temperature, parts of the plant.

It is preferred to have available a pipeline 62 for the addition of external hydrogen in the event of any temporary reduction of the hydrogen concentration in the tail gas mixture entering the reactor 60 to a level at which complete reduction of the sulphur dioxide might be jeopardised. The external hydrogen can be generated on site by, for example, partial oxidation of hydrocarbon, preferably using pure oxygen or oxygen-enriched air as the oxidant, or, in conjunction with carbon monoxide, by a reducing gas generator (not shown) using air, oxygen-enriched air, or pure oxygen as the oxidant.

If desired, the catalytic reduction reactor 60 may be provided with a cooling coil (not shown) in which a coolant, e.g. steam, may be passed in the event of there being an excessive generation of heat in the catalyst, or alternatively steam can be added directly.

The combustion of hydrogen sulphide, the Claus reaction between sulphur dioxide and hydrogen sulphide, and the catalytic hydrogenation of sulphur dioxide all entail the formation of water vapour. In the next stage of the process most of this water vapour is removed by condensation. The hydrogenated (reduced) tail gas, typically at a temperature in the order of 300° C., flows from the catalytic reduction reactor 60 through a heat exchanger 63 in which it is cooled typically at a temperature in the range of 100° C. to 200° C. by indirect heat exchange with water and/or steam. The thus cooled, reduced, tail gas flows into a desuperheating, direct contact, quench tower 64. If desired, the flow of the reduced tail gas to the quench tower 64 may be assisted by one or more eductors (not shown), employing steam, which mixes with the tail gas. In the quench tower 64 the reduced tail gas stream flows upwardly and comes into contact with a descending stream of water. The reduced gas stream is thus cooled and most (typically in excess of 85%) of its water vapour content is condensed, the condensate entering the descending liquid stream. (The condensate will include steam added to the reduced gas mixture in the eductors.) The quench tower 64 preferably contains a random or structured packing 65 so as to facilitate mass transfer between the ascending vapour and descending liquid. A water vapour-depleted gas stream is thereby formed in the quench tower 64. Water leaves the bottom of the quench tower 64 and is recirculated by means of a pump 66, the water being cooled in a cooler 68 upstream of reintroduction into the top of the quench tower 64. Excess (sour) water is removed through an outlet 70.

As a result of the operation of the quench tower 64, a water vapour-depleted, reduced tail gas is formed. Typically, the major component of this gas is carbon dioxide, but it also typically contains some water vapour, nitrogen and argon, and also traces of hydrogen sulphide and carbon monoxide (typically, less than one percent by volume of both these impurities). The water vapour-depleted, reduced tail gas flows out of the top of the quench tower 64 and is raised in pressure by operation of a blower or compressor 72 to a pressure a little above that at which the Claus furnace 16 is operated (typically this operating pressure being in the range of 1.2 to 2 bar). The flow of the pressurised (and water depleted) reduced tail gas is divided into two portions in a fixed ratio. If desired, a valve 74 may be used for this purpose. The larger (first) portion at least 60 per cent by volume and preferably from 75 to 90 per cent by volume) is sent via a pipeline 76 to the combustion (flame) region 22 of the Claus furnace 16. The smaller (second) portion is sent via a pipeline 78 to an incinerator 80 in which its residual hydrogen sulphide content is burned.

The recycle of the water vapour-depleted, reduced tail gas to the Claus furnace 16 influences the temperature in the combustion region 22. Typically, if all the larger portion is returned to the combustion region it will depress the temperature of the combustion region 22 to below the temperature at which complete destruction of the ammonia can be destroyed. Typically, therefore, a temperature in the furnace (preferably near the end of the combustion region 22) is sensed and if it is at or less than a chosen temperature (say, 1300° C.) a flow control valve 82 is opened and the excess water vapour-depleted, reduced tail gas is sent as shown via a pipeline 84 into a region of the Claus furnace downstream of the choke ring 24 and hence remote from the combustion region 22. Accordingly a sufficient temperature is maintained in the combustion region for the complete destruction of the ammonia.

If desired the larger (first) portion of the water vapour-depleted reduced tail gas may be premixed with the feed gas in the pipeline 12 or, as shown in FIG. 1, may be supplied separately to the burner 14.

Instead of or in addition to being supplied to a region of the Claus furnace 16 downstream of the choke ring 24, excess water vapour-depleted, reduced tail gas may be supplied to the upstream catalytic Claus reactor 36, being introduced into the effluent gas stream either at the inlet to the reheater 34 or at the inlet of the upstream catalytic Claus reactor 36 itself.

In order to start up the plant shown in FIG. 1, air and the feed gas may be supplied to the burner 14 and the resulting gas mixture ignited to create the combustion region 22. Initially, all the tail gas is sent to the incinerator 80. Then, the mole fraction of oxygen in the air is increased gradually, and a portion of the water vapour-depleted, reduced tail gas is recycled, making sure not to reduce unduly the temperature in the combustion region 22. Both the recycle rate and the oxygen mole fraction continue to be increased in concert with one another until the desired steady state operating conditions are attained. The plant can be shut down in a controlled manner by reversing this procedure.

The operation of the plant shown in FIG. 1 is further illustrated by the following example.

Suppose the plant receives 100 kmol/h of hydrogen sulphide in the feed gas stream. Suppose further that as a result of the operation of the plant 98 kmol/h of this hydrogen sulphide is converted to sulphur. Therefore the reduced tail gas will contain 2 kmol/h of hydrogen sulphide. 80% of this flow is recycled to the Claus furnace 16. 20% is sent to the incinerator 80. Accordingly, 1.6 kmol/h of hydrogen sulphide is recycled and 0.4 kmol/h of hydrogen sulphide is incinerated.

98% by volume of the recycled hydrogen sulphide is also inherently converted to sulphur. 2% remains as hydrogen sulphide in the reduced tail gas. Accordingly, the reduced tail gas includes an additional 0.02×1.6 kmol/h (=0.032 kmol/h) of hydrogen sulphide. 20% of this hydrogen sulphide is sent to the incinerator 80. Accordingly a further 0.0064 kmol/h of hydrogen sulphide is incinerated. Therefore of the 100 kmol/h of hydrogen sulphide entering the process only 0.4064 kmol/h is not recovered. Thus, the effective percentage conversion is approximately 99.6%.

In a further typical example of the plant shown in FIG. 1 a maximum of 132 tonnes per day of an acid gas are able to be treated. 80% of the water vapour-depleted tail gas is recycled to the Claus furnace 16, and the remainder is incinerated. The Table below gives an indicative mass balance of the operation, making the approximation that the oxygen is pure and thus ignoring its argon content:

TABLE

| Component | Feed Gas (T = 55° C.) | Flow into fourth sulphur condenser (T = 285° C.) | Flow out of catalytic reduction reactor (T = 355° C.) | Recycle flow (T = 35° C.) |
|---|---|---|---|---|
| $H_2S$ | 170.8 | 1.37 | 2.6 | 2.1 |
| $SO_2$ | — | 0.71 | — | — |
| $H_2O$ | 19.2 | 264.0 | 234.8 | 23.2 |
| $N_2$ | — | 36.7 | 36.7 | 29.4 |
| $NH_3$ | 14.7 | — | — | — |
| $CO_2$ | 29.6 | 139.5 | 170.2 | 136.2 |
| $H_2$ | — | 19.9 | 47.9 | 38.3 |
| CO | — | 32.4 | 1.77 | 1.4 |
| COS | — | 0.004 | — | — |
| $CH_4$ | 4.8 | — | — | — |
| S vapour (as $S_x$) | — | 5.9 | — | — |

The oxygen flow into the furnace 16 is 101 kmol/h.

Referring now to FIG. 2 of the drawings, the plant illustrated therein can achieve even higher sulphur recoveries than the plant shown in FIG. 1. The plant shown in FIG. 2 is generally the same as that shown in FIG. 1 save for the presence and operation of units for the recovery of hydrogen sulphide from the second or smaller portion of the water vapour-depleted reduced tail gas. In the plant shown in FIG. 2 of the drawings the second portion of the water vapour-depleted reduced tail gas passes along a pipeline 202 into an absorber vessel 204 in the form of a column. In the absorber vessel 204 this tail gas stream flows upwardly and comes into contact with an absorbent of hydrogen sulphide. Although absorbents are commercially available that selectively absorb hydrogen sulphide from carbon dioxide, there is no need in the invention to employ such a selective absorbent, and, instead, a non-selective absorbent such as the well known methyldiethanolamine can be used to absorb the hydrogen sulphide notwithstanding the much greater preponderance of carbon dioxide in the tail gas.

The absorber vessel 204 contains liquid-vapour contact means 206, typically a random or structured packing, so as to facilitate mass exchange between the ascending gas and the descending liquid. As the gas ascends the vessel 204 so it becomes progressively leaner in hydrogen sulphide, whereas as the liquid descends the vessel so it becomes progressively richer in hydrogen sulphide. A gas essentially free of all but the last traces of hydrogen sulphide passes out of the top of the absorber vessel 204 and flows to the incinerator 80.

Liquid absorbent containing hydrogen sulphide passes out of the absorber vessel 204 through an outlet 208 at its bottom and is urged by operation of a pump 210 into an upper region of a desorber or stripper vessel 212. The stripper vessel 212 is typically operated at a higher pressure than the absorber vessel 204. The stripper vessel 212 typically has a reboiler (not shown) in the form of an indirect heat exchanger in which liquid taken from the bottom of the vessel 212 is boiled by indirect heat exchange with steam. A vapour flow up the vessel 212 is thus created with the result that hydrogen sulphide and carbon dioxide are stripped from the vessel 212. The stripper vessel 212 is provided with liquid-vapour contact devices 214, typically in the form of random or structured packing, so as to facilitate mass transfer between the descending liquid and the ascending vapour. If desired, the top of the stripper vessel 212 may be provided with a condenser (not shown) so as to increase the flow of liquid down the packing. A stream of liquid essentially free of hydrogen sulphide can be discharged from the bottom of the stripper vessel through the outlet 216 and if desired may at least in part be returned to the top of the absorber vessel. A gas stream containing hydrogen sulphide and carbon dioxide is discharged from the top of the stripper vessel and may be fed into the first portion of the water vapour-depleted reduced tail gas flowing along the pipeline 76.

If desired, in the plant shown in FIG. 2, the compressor or blower 72 may be located in a region of the pipeline 76 downstream rather than upstream of its union with the pipeline 202, the former arrangement being the one shown in FIG. 2.

Operation of the absorber vessel 204 and the stripper vessel 212 makes it possible to achieve sulphur recoveries in excess of 99.9%, some 85% of the hydrogen sulphide flowing into the absorber vessel 204 typically being recovered. If a conventional plant including units similar to the absorber vessel 204 and the stripper vessel 212 is to be adapted to operation of the invention, it is found that there is a substantial reduction in the flow of hydrogen sulphide flowing through the absorber. The process according to the first aspect of the invention therefore offers the advantage of enabling the absorber units to be "debottlenecked".

Referring now to FIGS. 3 and 4 of the drawings, the plant shown therein is generally similar to that shown in FIG. 1 save that in the plant shown in FIG. 3 excess first portion of the water vapour-depleted, reduced tail gas is sent via a pipe 300 to a reheater 302 in which it is heated to above the solidification temperature of sulphur by indirect heat exchange with steam. The reheated gas typically leaves the reheater 302 and flows to a gas diffuser 304 located within the upstream catalytic Claus reactor 36 in an intermediate space 306 located between an upper bed 308 of supported activated alumina catalyst and a lower bed 310 of supported actuated alumina catalyst. (If desired, the intermediate space 306 may be kept to a minimum.) The preheating of the excess tail gas in the reheater 302 ensures that no solid sulphur will deposit in the gas diffuser 304.

By introducing the excess tail gas into he reactor 36 the temperature of the gas entering the lower (downstream) bed 310 is reduced. Such temperature reduction is particularly advantageous. Operation of the upstream end of the catalytic Claus reactor 36 at a temperature in the range 300° C. to 350° C. is desirable in order to ensure that any carbon oxysulphide and any carbon disulphide present are destroyed by hydrolysis. However, the catalysed Claus reaction between hydrogen sulphide and sulphur dioxide is also dependent on the temperature. Its equilibrium tends to shift at lower temperatures towards increased sulphur formation and hence higher sulphur conversion. For example, at equilibrium, the conversion is approximately 95% when the temperature is 260° C. and approximately 75% when the temperature is 350° C. The process according to the second aspect of the invention is thus able to aid considerably the achievement of high percentage conversions in the catalytic Claus reactor 36 by cooling the gas in the space 306 without compromising the destruction of carbon oxysulphide and carbon disulphide in the upper bed 308.

Typically, the temperature of the gas at the outlet from the bed 310 is monitored by means of a thermocouple 312. The thermocouple 312 is arranged so as to control a valve 314 upstream of the reheater 302. The arrangement is such that if the temperature sensed by the thermocouple falls to a chosen minimum, the rate at which gas is fed to the reheater 302 is diminished. It is therefore possible to ensure that the temperature of the gas exiting the Claus reactor 36 is always kept above the dew point of sulphur. Typically, the minimum temperature is set at 10° C. to 15° C. above the sulphur dew point, i.e. at a temperature in the range of 270 to 275° C.

In normal operation of the plant shown in FIG. 3, it is expected that the flow of excess water vapour-depleted, reduced tail gas will not reach that which would cause the temperature sensed by the thermocouple 312 to fall to the chosen minimum temperature. Nonetheless, means may be provided to divert flow of water vapour-depleted, reduced tail gas to the region of the Claus furnace 16 downstream of the choke ring 24 in the event of this minimum temperature being reached.

Various changes and modifications may be made to the plants shown in FIGS. 1 to 3 of the drawings. For instance, different catalytic materials from supported alumina may be used in the catalytic Claus reactors. In one example, a supported titania catalyst is used instead. Another alternative is to substitute for the most downstream catalytic Claus reactor 52 a selective catalytic oxidation reactor, in which oxygen molecules e.g. in a flow of oxygen, oxygen-enriched air, or air, are selectively reacted with hydrogen sulphide to form sulphur vapour and water vapour. Such selective oxidation methods are well known in the art.

A further alternative is to operate the Claus furnace 16 with a stoichiometric deficit of oxygen in comparison with that required to form a gas mixture having a mole ratio of hydrogen sulphide to sulphur dioxide equal to 2:1 at the outlet of the first sulphur condenser 30. As a result, the mole ratio of hydrogen sulphide to sulphur dioxide at this point is greater than 2:1. Accordingly, there is typically less sulphur dioxide to reduce in the catalytic reduction reactor 60, thereby making this unit easier to operate.

The invention claimed is:

1. A process for recovering sulphur from a feed gas stream comprising hydrogen sulphide, including subjecting the feed gas stream to Claus reaction between hydrogen sulphide and sulphur dioxide in a train of stages comprising, in sequence, at least on thermal stage and a first catalytic stage, taking at least part of the flow through the train from downstream of the first catalytic stage, reducing its sulphur dioxide content to hydrogen sulphide to form a reduced gas flow, condensing water vapour out of the reduced gas flow, and introducing a temperature moderating stream of the resulting water depleted reduced gas flow into an intermediate region of the first catalytic stage.

2. The process according to claim 1, in which the introduction of the said temperature moderating stream is controlled so as to keep the temperature of the gas flow out of the first catalytic stage at or above a chose temperature.

3. The process according to claim 2, in which the said chosen temperature is at least 5° C. above the dew point of the sulphur.

4. The process according to claim 1, in which the region of the first catalytic stage upstream of the introduction of the temperature moderating stream is operated at a temperature which ensures essentially complete destruction of any carbon oxysuiphide and any carbon disuiphide present.

5. The process according to claim 1, in which the water vapour-depleted reduced gas flow is heated to above the sulphur solidification stage upstream of introduction into the first catalytic stage.

* * * * *